Nov. 12, 1963 R. F. KUEHLMAN 3,110,245
SLABBER FOR HAYLAGE AND SIMILAR MATERIALS
Filed Nov. 8, 1960 2 Sheets-Sheet 1

INVENTOR.
ROBERT F. KUEHLMAN
BY

Nov. 12, 1963 R. F. KUEHLMAN 3,110,245
SLABBER FOR HAYLAGE AND SIMILAR MATERIALS
Filed Nov. 8, 1960 2 Sheets-Sheet 2

INVENTOR.
ROBERT F. KUEHLMAN
BY
Grune, Pineles & Durr

# United States Patent Office 3,110,245
Patented Nov. 12, 1963

3,110,245
SLABBER FOR HAYLAGE AND SIMILAR
MATERIALS
Robert Frederick Kuehlman, 50 Glenhurst Drive,
Oberlin, Ohio
Filed Nov. 8, 1960, Ser. No. 68,060
6 Claims. (Cl. 100—139)

This invention relates to a slabber for the compacting of incompletely dried hay and similar forage materials which have recently been given the name haylage.

Until fairly recently hay has been harvested by processes which include substantially complete drying thereof. It has been recognized for some time, however, that hay loses a considerable amount of its nutritive value when dried either by the sun or artificially. Since new storage equipment has become available such as, for example, air tight, glass lined storage vessels, relatively green hay (haylage), containing, for example, 30–50% or preferably about 40% moisture it has been found that such haylage has superior nutritive value to ordinary silage even though it has a somewhat lower cost. See, for example, (a) "Storage Feeding," page 28 by Ovid Bay and Ray Denkenbring. Central edition of Farm Journal, Sept. 1960.

(b) "Haylage—New Finishing Feed" by Dick Braun, page 38. Central edition of Farm Journal, Sept. 1960.

(c) "Haylage Feeding Trials With Dairy Cattle." Conducted by South Dakota College of Agriculture, Brookings, South Dakota—Howard Voelker and Emery Bartle, 1958.

Haylage at the present time is cut, dried either artificially or in the sun to about 40% moisture content and, thereafter, chopped to smaller particles and stored in an air-tight, glass-lined storage vessel. After chopping it has been proposed to pelletize the product to provide for the storage of greater amounts in the storage vessel. Pelletizing requires heavy and expensive equipment to obtain proper feeding of measured amounts of chopped hay to the pelletizer. Without some kind of pressing the volume of the glass-lined vessel is quickly filled and then subsequently quickly used up.

Compressing hay containing of the order of 40% moisture between a series of compressor rollers is an unsatisfactory solution because hay of this moisture content adheres to the rollers and, therefore, tends to jamb the equipment and eventually results in a breakdown of the equipment. This clogging or jamming effect has been noted with hay balers of the type having compression chambers when fed with hay or forage of over 40% moisture content.

Among the objects of this invention is to provide a process and device for pressing hay with a moisture content of the order of 40% to a small continuous slab while retaining the hay mass in its natural matter condition to aid in feeding the same through the slabbing device.

Among other objects of the invention is to provide a simple, compact device for forming a slab from hay and similar forage which have moisture contents of such values as to make them unsuitable for slabbing by roller pressure and by the known baling devices.

The objects of the invention are attained by providing means for continuously feeding a continuous mass of matted hay to a pair of converging pressure plates which are mounted to oscillate back and forth in the direction of movement of the mass of hay. The plates have means thereon which tend to grip the hay matt and move the matt therewith when the plate is moving in the direction of the convergent end, these means being adapted to slide over the matt when the plate is moved in the opposite direction. A very careful adjustment of the means for moving the plates is provided so that one or the other of the opposed plates is always moving forward. Since the plates are converging, movement of the matt of hay therethrough gradually compresses the matt. The opening at the convergent end of the plates can be of various sizes dependent on the rate of feed of hay thereto. It has been found, however, that an exit opening of the order of ⅛ to 1 inch is very satisfactory when hay is fed at such a rate that the pressure applied is at least about 150 p.s.i. After leaving the compressor plates, the haylage has the appearance of a piece of wall board and may be immediately chopped to suitable size for handling in a silo or glass-lined storage vessel. The size of the chopped pieces can be controlled by the speed of the knives with respect to the speed of feed of the compressed slab of haylage.

Figure 1:
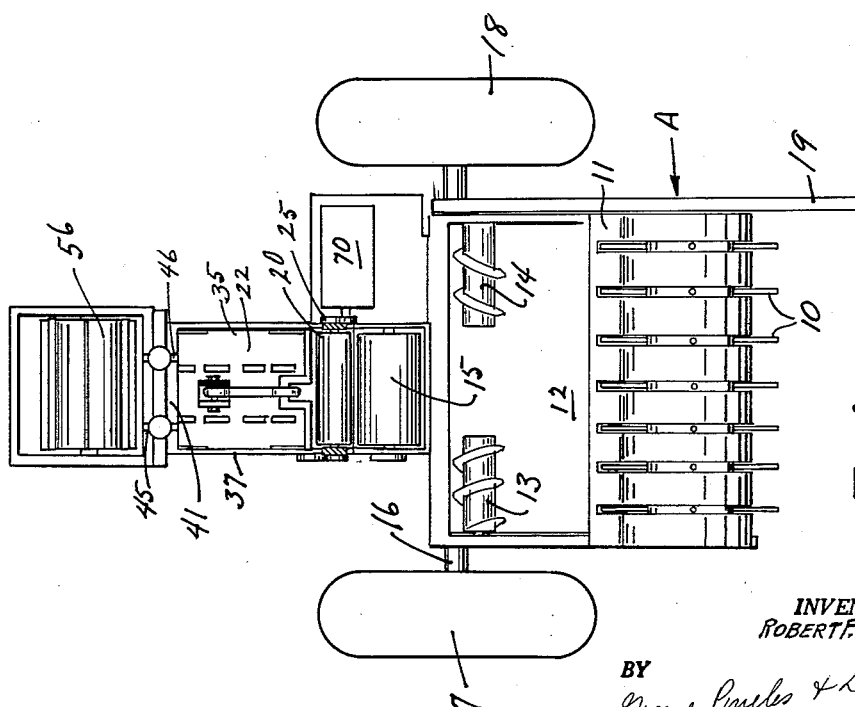
FIG. 1 is a top plan view, partly diagrammatic, showing how the device of the invention is applied to a hay gathering device.

The device of the invention is adapted to be attached to any type of gathering and feeding device such as the windrow-pick-up device A of FIG. 1. Although the hay gathering and feeding device A is not a part of the present invention and is added only to illustrate how a matt of hay or similar material is fed to the slabber of the invention, the windrow pick-up will be described briefly. Thus, hay in the form of windrows is picked up by the forks 10 rotating below a stationary apron 11 and fed to the belt conveyor 12. The augers 13 and 14 reduce the width of the matt to about 18", for example and feed said matt to the rollers 15 (only one shown). The whole device may be mounted on an axle 16 fitted with rubber-tire wheels 17 and 18 and with a tongue means 19 for attaching to a tractor. From the roller 15 (which may be omitted, if desired) the matt passes to the compressor device of the present invention.

The compressor device comprises a pair of feed rollers 20, 21 and the oscillating plate slabber 22—23. The feed rollers are opposed but slightly spaced from each other, the upper roller 20 being mounted on a shaft 24 which is spring pressed by springs 25 toward roller 21 so that roller 20 floats above roller 21. Normally the rollers almost touch but spring 25 allows the roller 20 to move above roller 21 for about 4–5 inches, for example. The rollers 20, 21 are positively driven from motor or engine 70, for example. Preferably one of the rollers 20 or 21 is driven slightly faster than the other; the rubbing action produced by driving one roll 20 or 21 faster than the other prevents the accumulation of wax on the rollers.

From the rollers 20—21 the matt passes to the plates 22, 23. Plate 23 is slidably on stationary platform 26 and preferably contains a lower bearing surface 27 inside of "Teflon" or of "nylon" impregnated with molybdenum sulfide. The platform 26 contains a longitudinal slot 28 therein through which the ears 29 of plate 23 project. The ears 29 hold the axle 30 to which one end of the shaft 31 is connected. The other end of shaft 31 is connected to the crank 32 of shaft 33 whereby rotation of the crank 32 causes the plate 23 to move back and forth on the platform 26. The pressure of the matt of hay between plates 22 and 23 will hold the plate 23 against platform 26. After the hay passes beyond the convergent ends of the plates 22, 23 it is in the form of a slab and may be cut to a convenient size by the cutter 39.

Figure 2:
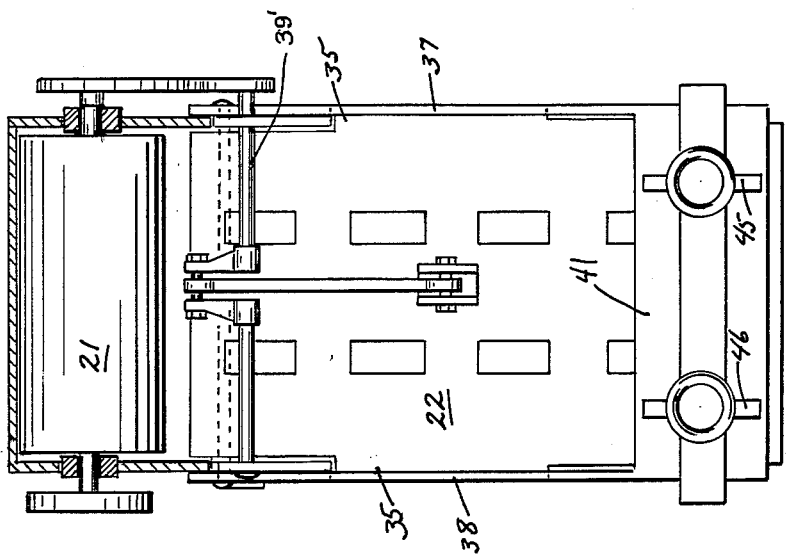
FIG. 2 is a top plan view of the device itself.
Figure 5:
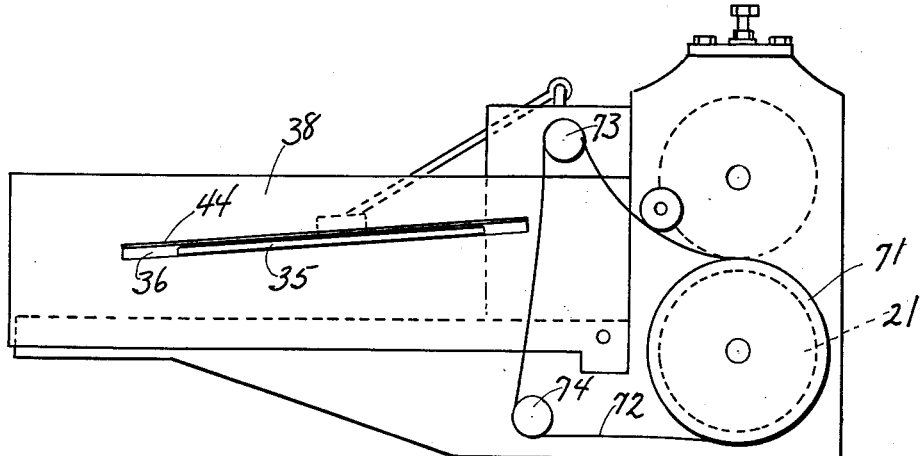
FIG. 5 is a side view taken from the opposite side to that shown in FIG. 3.

The plate 22 is similar in construction to plate 23 but contains a flange 35 at each side thereof (see FIGS. 2 and 5). Flanges 35 are adapted to slide in the slots 36 of the two side supports 37 and 38 and, in fact, the position of the plate 22 is determined only by the side supports 37 and 38 and by the shaft 39' and crank 40. The upper edge of the slots 36 may be lined with a strip 44 of "Teflon" or with $MoS_2$-impregnated nylon to provide a low friction sliding surface. A very satisfactory distance "a" for the entrance end of the oscillating plates 22 and 23 is about four inches, thus the length of the crank arm 40 or 32 may be about 2 inches. However, a smaller or longer distance of plate movement may be employed. Rollers 20 and 21 which are approximately 12" in diameter work very well with oscillating plates of these dimensions and the peripheral speed of the rollers 20 and 21 is approximately equal to the combined speeds of the forward movement of plates 22 and 23.

The side supports 37 and 38 are connected together by one or more cross bars 41, 42 and are attached to the base platform 26 by a single shaft 43 adjacent the end next to rollers 20, 21. The opposite end of side plates 37, 38 is not fixed with respect to platform 26 but is held close to the platform by springs 45, 46. The pressure on spring 46 can be adjusted by screw 48 which is supported from a framework 47, 49 connected to the platform 26. The crank shaft 40 is supported from framework 26' connected to the platform 26.

Figure 4:
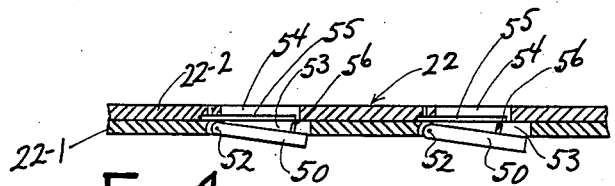
FIG. 4 is a detail view of a portion of a compressor plate.

In order to positively move the matt through the converging plates 22 and 23, the spur devices 50, 51 have been provided in said plates 22 and 23. As shown in FIG. 4 these spur devices are mounted for retraction when the plate is moving in the opposite direction to the movement of the matt. Thus, each of the plates 22 or 23 may be formed of two separate sheets of metal 21–1 and 22–2, for example. Two or more spur devices 50 are pivotally mounted at 52 in slots 53 of the lower plate 22–1. The upper plate 22–2 contains openings 54 back of a certain portion of the slots 53 and a leaf spring 55 is mounted in said openings 54. The spur devices 50 include a lug 56 or similar structure adapted to contact springs 55 so that springs 55 tend to push the spur devices 50 away from the plate 22–1. The lower plate 23 is similarly constructed. The rows of spurs 50 should be spaced about the same distance as the throw of the crank 40 or 32. Thus, with a 2" crank having a throw of 4" the spurs should be about 4" apart.

At the exit end of the convergent plates 22, 23 a cutting plate 60 is positioned so that the compressed haylage may be cut and collected as it emerges from the pressure plate.

In the apparatus disclosed the lower roller 21 is driven through gear 25 by the engine 70 (shown only diagrammatically in FIG. 1) and the roller 21 drives the cranks 32 and 40 (see FIG. 5) through gear or pulley 71 at the opposite side of the apparatus, belt 72 and gears or pulleys 73 and 74 for crank shafts 40 and 33, respectively. It is obvious, however, that many different gear, chain or belt drive means can be devised for operating the various parts of the apparatus.

Figure 3:
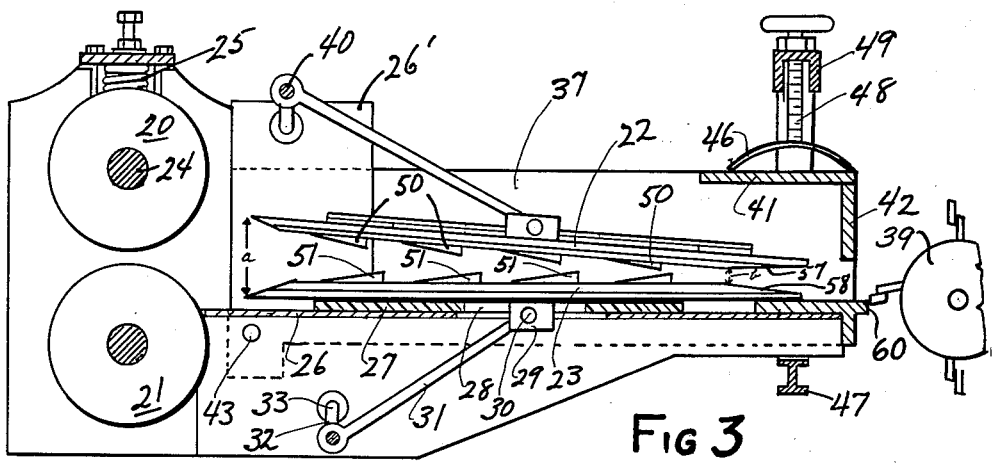
FIG. 3 is a side cross sectional view of the device of the invention.

As an example of applicant's process, hay is cut in the field and allowed to dry to a moisture content of about 40%. The hay is picked up and collected on a device such as shown in FIG. 1 and fed directly to the rollers 20, 21 of applicant's apparatus. The rollers 20, 21 preliminarily compress the hay matt and feed it to the space between plates 22, 23. The apparatus works very satisfactorily when the distance "a" (FIG. 3) is about 4 inches and when the matt of hay fed to rollers 20, 21 is such as to separate these rollers about, or slightly less than 4 inches. The distance "b" at the convergent end of the plates 22, 23 varies in accordance with the pressure on springs 45, 46 but a very satisfactory product is obtained when the pressure applied by the plates is at least 150 pounds per square inch (p.s.i.), the slab produced being less than about 1 inch. This provides a substantial reduction in volume; in a glass-lined vessel for storing haylage the maximum pressure applied to the material at the bottom of the vessel is about 75 p.s.i. It will be noted that the facing portion of the discharge ends 57 and 58 of the plates 22 and 23 are tapered so that the discharge opening between the two plates is substantially the same regardless of the position of the plates. The slab formed is cut to convenient size which depends on the speed of rotation of the knives of cutter 39.

The features and principles underlying the invention described above in connection with specific exemplifications will suggest to those skilled in the art many other modifications thereof. It is accordingly desired that the appended claims shall not be limited to any specific feature or details thereof.

I claim:

1. A device for pressing partially dried hay and similar cut forage materials containing about 30–50% moisture content comprising a pair of opposed, spaced, plates, means for feeding a matt of the material to be compressed to the space between said plates at one end thereof, each of said plates being mounted for backward and forward oscillating movement in the direction of feed of said material, means defining the paths of said plates to substantially straight backward and forward movement, at least one of said plates being slidably mounted to converge toward the other plate in the direction of feed of said material to be compressed and means for oscillating said plates in timed relation so that one plate is substantially always moving in the forward direction, each of said plates having means to resist slippage of the forage material with respect to the plate during the forward movement of the plate but permit slippage thereof during the backward movement of the plate.

2. A device for pressing partially dried hay and similar cut forage materials containing about 30–50% moisture content comprising a pair of opposed, compression plates spaced one above the other, means for feeding a matt of the material to be compressed to the space between said plates at one end thereof, each of said plates being mounted for backward and forward oscillating movement in the direction of feed of said material, means defining the paths of said plates to substantially straight backward and forward movement, at least one of said plates being slidably mounted to converge toward the other plate in the direction of feed of said material to be compressed, detent means on said plates to hold and move the matt of material during the forward movement of the plate and release said matt during the backward movement thereof, and means for oscillating said plates in timed relation so that one plate is substantially always moving in the forward direction.

3. The device of claim 2 wherein the means for feeding the matt of material to the plates comprises a pair of rollers.

4. The device of claim 2 wherein the means for defining the paths of oscillatory movement of at least one of said plates comprises a pair of side supports each containing an elongated cam slot, means on the sides of one of said plates adapted to slide in said cam slots to thereby control the path of said plate.

5. The device of claim 2 wherein the means for defining the oscillatory path of the lower plate comprises a stationary platform below said lower plate, a pair of side plates extending in a perpendicular direction with respect to and along the sides of said compression plates, means for pivotally mounting onto said platform the two corresponding ends of said side plates which are adjacent the feeding means, said side plates comprising a pair of parallel cam slots one in each plate, each of said slots converging toward that end of the plate opposite said feeding means, cam follower means on the upper plate adapted to follow said cam slots to thereby impart a downward component to the forward movement of the upper plate.

6. The device as claimed in claim 5, comprising spring means adapted to force the ends of the pivotally-mounted side plates which are opposite said feeding means downwardly toward said platform.

References Cited in the file of this patent

UNITED STATES PATENTS

| | | |
|---|---|---|
| 764,926 | Dederick | July 12, 1904 |
| 987,869 | Epps | Mar. 28, 1911 |
| 1,564,629 | Ruth | Dec. 8, 1925 |
| 1,819,480 | Paxton | Aug. 18, 1931 |
| 2,575,672 | Miller | Nov. 20, 1951 |
| 2,716,317 | McClellan | Aug. 30, 1955 |
| 2,716,318 | Skromme | Aug. 30, 1955 |
| 2,765,732 | Leader | Oct. 9, 1956 |